(12) United States Patent
Viaud et al.

(10) Patent No.: US 7,114,435 B2
(45) Date of Patent: Oct. 3, 2006

(54) LARGE ROUND BALER

(75) Inventors: Jean Viaud, Gray (FR); Daniel Eric Derscheid, Ottumwa, IA (US)

(73) Assignee: Deere & Company, Moline, IL (US)

( * ) Notice: Subject to any disclaimer, the term of this patent is extended or adjusted under 35 U.S.C. 154(b) by 330 days.

(21) Appl. No.: 10/437,859

(22) Filed: May 14, 2003

(65) Prior Publication Data

US 2004/0000131 A1    Jan. 1, 2004

(30) Foreign Application Priority Data

May 23, 2002  (DE)  ................................ 102 22 715

(51) Int. Cl.
*B30B 5/04* (2006.01)
*A01D 39/00* (2006.01)

(52) U.S. Cl. ........................... 100/88; 100/87; 100/89; 56/341

(58) Field of Classification Search ................. 100/87, 100/88, 89, 100, 177; 56/341, 344, 10.1
See application file for complete search history.

(56) References Cited

U.S. PATENT DOCUMENTS

| 4,334,467 | A | * | 6/1982 | Nishibe et al. | ............... | 100/89 |
| 4,370,848 | A | * | 2/1983 | Campbell et al. | ............. | 56/341 |
| 6,640,699 | B1 | * | 11/2003 | Viaud | ............................. | 100/7 |
| 6,729,118 | B1 | * | 5/2004 | Viaud | ........................... | 56/341 |
| 2002/0121200 | A1 | | 9/2002 | Viaud | | |

FOREIGN PATENT DOCUMENTS

| DE | 27 39 935 | 3/1979 |
| DE | 28 07 058 | 8/1979 |
| DE | 32 34 882 C2 | 4/1983 |
| DE | 35 01 062 | 7/1985 |
| DE | 39 20 377 | 1/1991 |
| DE | 39 20 377 A1 | 1/1991 |
| DE | 1 264 531 A1 | 12/2002 |

* cited by examiner

*Primary Examiner*—Derris H. Banks
*Assistant Examiner*—Jimmy T. Nguyen

(57) ABSTRACT

In known large round balers, a rotating side wall is provided that can be pivoted away from a baling chamber either in a straight line or about a pivot axis, so that the pressure on the end faces of the cylindrical bale is reduced during the unloading process. A large round baler is proposed in which a support structure provided with rolls for supporting one or more flexible bale-forming elements, which can be pivoted about a pivot axle that penetrates the side walls of the baling chamber. At least one side wall is provided with a ramp having an inclined surface which is ramped outwardly from the side wall from top to bottom. The support structure is provided with an abutment member that can slide on the surface of the ramp so as to move from bottom to top when the support structure is raised to effect a discharge of a formed bale. The ramp is maintained in engagement with the abutment member, which travels in a vertical plane, due to outward deflection of the side wall, which results in a decrease of the force applied by the side wall on the bale and the frictional force resisting movement of the bale relative to the wall so as to aid in the discharge of the formed bale from the baling chamber.

5 Claims, 3 Drawing Sheets

LARGE ROUND BALER

FIELD OF THE INVENTION

The invention concerns a large round baler with a baling chamber that is defined by side walls and bale-forming elements, where at least one side wall is configured and arranged at least in part as elastic and at least one bale-forming element can be pivoted by means of a support structure mounted for pivoting about a horizontal transverse axis.

BACKGROUND OF THE INVENTION

DE-A-39 20 377 discloses a large round baler with a baling chamber of constant size that is surrounded around its circumference by rollers extending horizontally. The rollers of a forward group are supported, free to rotate, in bearings carried by a fixed housing part, while the remaining rollers are supported, free to rotate, in bearings carried by a rear housing part that is pivoted vertically. The pivoted, rear housing part is provided with a locking hook that opens diametrically towards the center of the baling chamber. The end faces of the baling chamber are closed by circular end face walls that are supported in bearings, free to rotate, by means of a shaft in a pivoting frame. The pivoting frame can be pivoted outward about two bearings or it can be retained in an inward end position. The pivoting frame can be arrested by the locking hook that overlaps the pivoting frame and fixes it toward the outside. Furthermore the side walls are driven in order to improve the process of building a bale. If the side walls deflect outward according to this known arrangement as a result of the opening of the baling chamber, the pressure on the end faces of the cylindrical bale is reduced along with the friction resulting therefrom, so that the cylindrical bale can roll out of the baling chamber without any problems.

From U.S. Pat. No. 4,334,467, a large round baler is also known, this time however, with a baling chamber of variable size, whose side walls can rotate and one of which can be repositioned towards the longitudinal centerline of the large round baler. The repositioning of the particular side wall is performed by means of a hydraulic motor and also has the intent of reducing the friction forces on the bale during the ejection process.

SUMMARY OF THE INVENTION

The problem underlying the invention is seen that in the above-described German patent, there is the need for the pivoting frame to be in an appropriate position so that the locking hook can overlap it, and as concerns the above-described United States patent, there is the problem that the hydraulic motor may become damaged, for example, it can leak if the forces on the particular side wall do not act centrally but from one side.

According to the present invention, there is provided an improved manner of repositioning a baling chamber side wall.

An object of the invention is to provide an inclined member or ramp surface that is joined to a baling chamber side wall and is sloped to increase in height downwardly relative to the chamber side wall and to provide an abutment surface on a pivoted support structure which cooperates with the ramp surface during bale discharge so as to release a repositionable side wall of the baling chamber so as to release a bale from the baling chamber. In this way, the support structure need not first be brought into alignment with any given location of the side wall and problems with the connection do not develop. Rather, the ramp surface and a mating abutment surface always remain in a forced engagement relationship, and only the movement, resulting from the inclination of the ramp, is a function of the position of the support structure. The slope of the ramp may be constant or it can also be variable, for example, progressive. If the associated components are not separated but only the spatial relationship to each other changes, the particular region can be covered or shielded so that the ramp surface does not become dirty or jammed. The ramp face can extend in a circle as well as in a spiral or helix and covers a part of a circle that extends, for example, only over 180°. The ramp surface that is inclined upward, as well as the mating surface of the follower, may consist of a rigid plastic or be coated with it, which avoids friction, noise, and the like or reduces them. The ramp can be located very close to the pivot axis, and for example, cover a diameter from 0.2 to 0.5 meters. To reduce the friction forces on the cylindrical bale, it may already be sufficient if only one side wall can deflect to the outside. The ramp surface may be provided on the side wall and the abutment member on the pivoted part or vice versa.

If the pivot axis is located in the central region of the baling chamber and radially close to it, the ramp may be provided with a slight grade, since in contrast to a pivot axis located peripherally, the ramp extends over a large angular region and can cover a large path in order to reach the desired repositioning path.

If the side wall is, or the side walls are, equipped with reinforcing struts, for example, profiles, rails, tubes, flanges or the like, to provide bending stiffness, the repositioning forces transmitted by the ramp can be transmitted uniformly to the outer regions of the particular end face. The direction of the reinforcing struts, in a starburst pattern, largely avoids uneven bending moments across the extent of the side walls. A tangential pattern is not opposed if the reinforcing struts converge in the center of the pivot axis while leaving an opening. The chamber remaining between the reinforcing struts is appropriate to take up and protect the ramp and the abutment member.

The joints used in the state of the art for the connection of the side walls so that they can be repositioned to the frame of the large round baler can also be omitted if the side wall is so flexible in the attaching region that it permits the outward movement by several degrees with sufficient flexibility, perhaps configured with springs. It would also be possible to retain the side wall in an elastic or spring-supported receptacle on the frame.

Sufficient space for the sideways movement of the side-wall on the one hand and secure retaining of the ramp and the abutment member on the other hand is attained if the support structures are retained, free to pivot, on an axle or a shaft that is arranged at a frame of the large round baler and ends at a distance from the side wall. Thereupon, the frame of the large round baler is located outside the side walls, if necessary with sheathing etc., and adjacent each side wall, is provided with an axle or a shaft, that is, for example, a tube, a solid material or the like that extends horizontally from the outside to the side wall following inward, but ends before it.

If the outer edge of the side walls in the pivoting region of the support structures is located at a radius about the pivot axis of the support structures, one or more of the bale-forming elements may be configured wider than the baling chamber and can be conducted along the periphery of the side walls.

In a large round baler with a variable baling chamber, particularly dense cylindrical bales can be produced so that with this type of machine, the effect of side walls that can be repositioned is all the greater.

The friction forces that occur at the ramp during the pivoting of the support structure are avoided or reduced by providing rolls, wheels, balls or the like on the abutment member.

BRIEF DESCRIPTION OF THE DRAWINGS

The drawing shows an embodiment of the invention that shall be described in greater detail in the following.

DESCRIPTION OF THE PREFERRED EMBODIMENT

Figure 1:
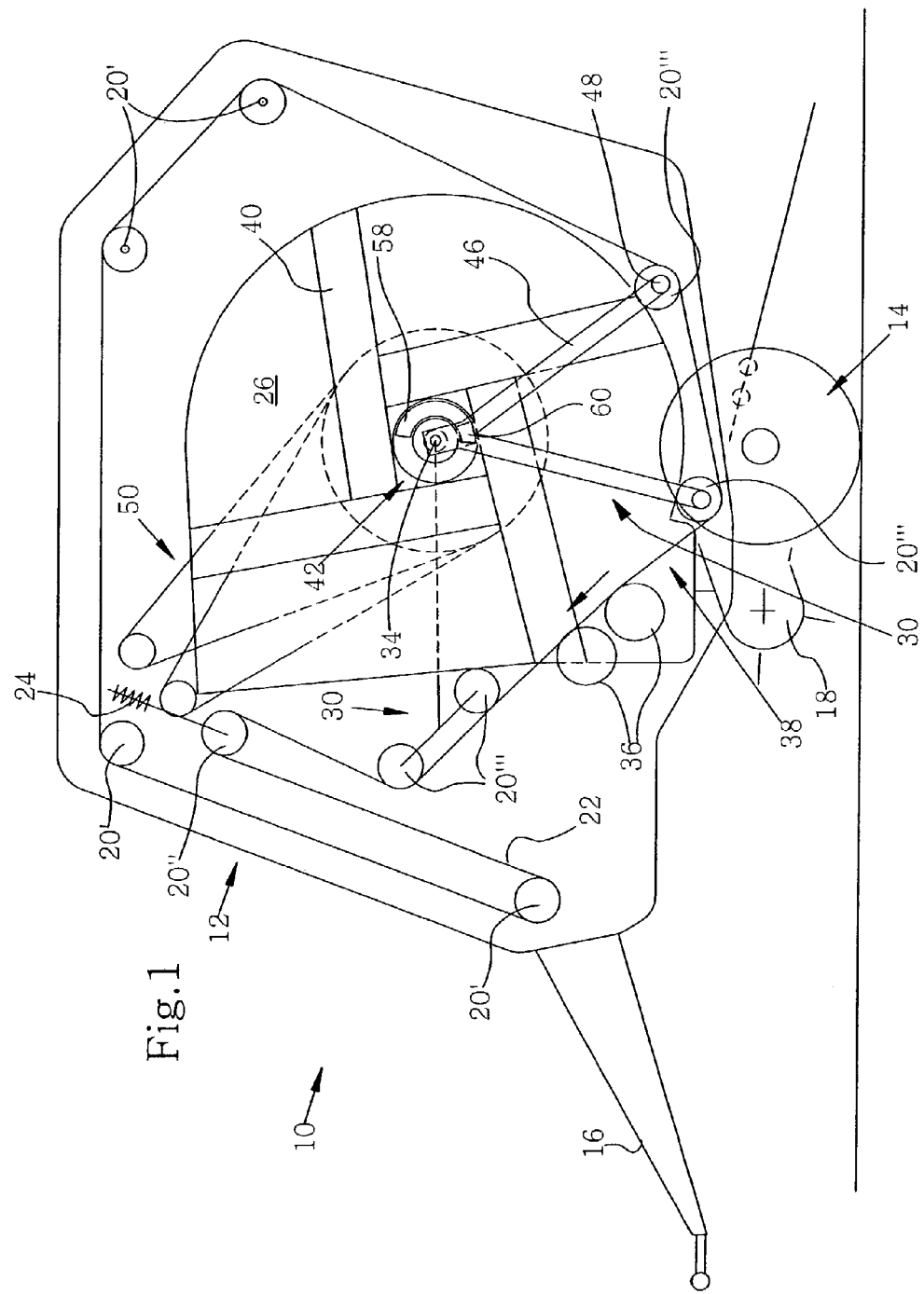
FIG. 1 is a schematic left side view of a large round baler constructed in accordance with the present invention and showing the baling chamber in a closed position.

Referring now to FIG. 1, there is shown a large round baler 10 including a frame 12, a chassis 14, a towbar 16, a take-up arrangement 18, rolls 20, bale-forming elements 22, a tensioning arrangement 24, side walls 26, a baling chamber 28, support structures 30, and a pressure arrangement 32.

The large round baler 10 is equipped with a baling chamber 28 that can be varied in its size, but may also be equipped with a baling chamber of fixed size. In the baling chamber 28, harvested crop taken up from the ground is formed into a so-called cylindrical bale, which presses with its end faces on the side walls 26.

Figure 2:
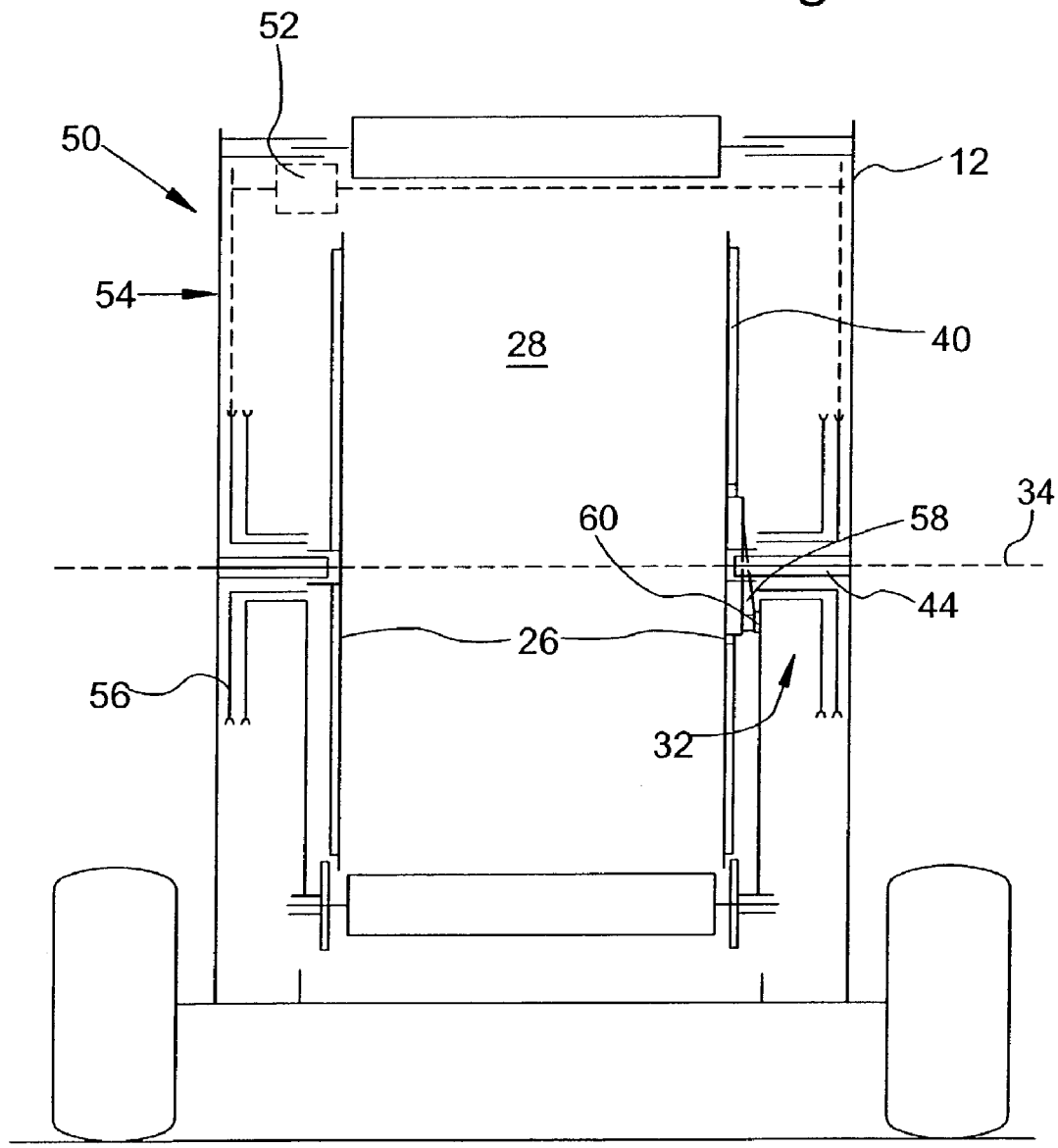
FIG. 2 is a schematic rear view of the large round baler illustrated in FIG. 1.

The frame 12 can be seen particularly well in FIG. 2 and is composed of a welded and/or bolted assembly to which all components of the large round baler 10 are fastened. The frame 12 is supported on the chassis 14 with the latter including a forwardly projecting towbar 16 for coupling the baler 10 to a towing vehicle, not shown. The frame 12 carries, among other items, sheathing components, not shown, several of the rolls 20, the side walls 26, and the support structures 30. The frame 12 encloses the region surrounded by the side walls 26 and the bale-forming elements 22 in a wider area.

The chassis 14 consists, in a way not described in any further detail, of an axle and wheels on which the frame 12 rests.

The towbar 16 is rigidly secured to the front side of the frame 12 or secured such that it can be repositioned in height.

The take-up arrangement 18 is configured in the usual manner as a so-called pick-up and attached to the frame 12 so that it can be repositioned in height. A cutting arrangement, also known in itself, can be arranged to follow the take-up arrangement 18. The take-up arrangement 18 takes up crop deposited on the ground and conducts it to the baling chamber 28 over a cutting arrangement that may be present, where it is formed into a cylindrical bale.

Several of the rolls 20' are supported, free to rotate, in several bearings provided in the frame 12. Another roll 20" can be repositioned against the force of a spring forming part of a tensioning arrangement 24 so that the bale-forming elements 22 can deflect to accommodate the growing diameter of the bale. Other rolls 20''' can be pivoted on support structures 30 about a pivot axis 34. These rolls 20''' are configured with such a width, extend parallel to each other, and are arranged in such a way that the bale-forming elements 22 run over them and can enclose the baling chamber 28. In addition to the rolls 20', 20", and 20''', rollers 36 are also provided that are located above an inlet opening 38 of the baling chamber 28, operate as so-called starter rolls during the beginning of the bale forming process, and support a part of the weight of the cylindrical bale.

The bale-forming elements 22 are configured as belts extending parallel to each other that essentially cover the baling chamber 28 across its width. Instead of the configuration as belts, one as bar chain conveyors or one as a wide band belt could also be selected, as is also known practice; in these cases, only one bale-forming element would be used, which however, should also fall under the protection of the patent law. The bale-forming elements 22 are endless and are brought into circulation by frictional contact with at least one roll 20' by which they are driven. In the region of the inlet opening 38, the bale-forming elements 22 form a bridge which deflects increasingly inward and forms a loop with increasing harvested crop and surrounds the cylindrical bale. The bale-forming elements 22 are kept under tension since they run over the roll 20" whose position can be varied only against the resistance of the tensioning arrangement 24.

The tensioning arrangement 24 is formed in a known manner by the roll 20" being conducted on an arm, a slide or the like, not shown, against the force of a spring and constantly maintains tension in a loop of the bale-forming elements 22.

The side walls 26 are generally "D"-shaped, as viewed in FIG. 1, where the rear end region forms an arc that generally follows the circumference of the completed bale, that is, along a part of a circle arc. The side walls 26 are basically configured as one-piece components, that is, they are not divided along an approximately central vertical plane, as is the case with usual large round balers. The walls 26 can, however, be composed throughout of several parts. FIG. 2 reveals that the side walls 26 are located at a not inconsiderable distance from the frame 12 and hence can be deflected to the outside, as shall be described below. The side walls 26 are configured so as to be stiff in bending by means of reinforcing struts 40, where the reinforcing struts 40 can be applied by bolting or welding. According to the illustration of FIG. 2, the reinforcing struts 40 extend in a nearly star-burst pattern relative to the pivot axis 34 and extend tangential to the latter with little spacing, in order to meet more or less at right angles. On the basis of this course, they enclose a square chamber 42 in this embodiment. In their forward end region, the side walls 26 are generally connected rigidly with the frame 12. However, a small pivoting movement is possible starting from a position according to FIG. 2, through a few degrees to the outside, by virtue of the fact that the side walls 26 in the connecting region are formed, for example, of an elastic sheet metal or are secured in an elastic connection, for example, by a flexible flange or by spring-loaded screws. The attachment of the side walls 26 to the frame 12 is generally performed along a more or less vertical line at the forward end of the baling chamber 28. In the region of the pivot axis 34, each side wall 26 is conducted on an axle 44 that is connected rigidly to the frame 12 and is used simultaneously as the pivot axis 34 for the support structures 30.

In contrast to the embodiment shown, the connection of the side wall 26 or the side walls 26 can also be performed along an upper line that is more or less horizontal or slightly inclined, so that the result is a divergence of the side walls 26 that increases downward to aid in discharging the cylindrical bale during ejection.

The baling chamber 28 is variable in its size and is bordered at the beginning, that is with an empty baling chamber 28, by an approximately triangular space between the take-up arrangement 18 and the baling elements 22 and at the sides by the side walls 26. With increasing harvested crop conducted into the baling chamber 28, this space is enlarged and finally occupies a cross section that follows the shape of the side walls 26 in its rear region.

In this embodiment, the support structures 30 are equipped on each side with one or more arms 46 extending radially from the pivot axis 34 and one or more transverse member or members 48 attached to the arms 46 at their radially outer ends. One of the rolls 20''' is provided at the end of each transverse member 48. The support structures 30 are arranged, free to pivot, with the radially inner ends of each arm 46 on a respective one of the axles 44. The position of the arms 46 is controlled by means of a drive 50 that includes a motor 52 and flexible, endless drive transmitting elements 54 or any other pivoting drive for each support structure 30. The motor 52 can be braked in each of its positions and retains the arms 46 in a corresponding stationary position. The driven gears 56 associated with each of the drive transmitting elements 54 are supported in bearings concentric to each other and to the axis 34, and connected in each case, fixed against rotation, with one support structure 30. The support structures 30 are controlled in such a way that the forward support structure 30 is repositioned during the bale forming phase in order to assist in the formation of the core of a bale, and that the rear support structure 30 occupies a lower position while the cylindrical bale is being formed and an upper position, when it is being discharged or ejected. The two end positions of the rear support structure 30 are respectively shown in FIGS. 1 and 3. It should be noted particularly that the forward support structure 30 is not necessarily mandatory.

The large round baler described so far is generally described in all its details in U.S. patent application Ser. No. 10/163,156, filed 4 Jun. 2002, whose contents is hereby incorporated in this application.

As can best be seen in FIG. 2, the pressure arrangement 32 includes a ramp 58, having a surface which increases from top to bottom in height from the chamber side wall 26, and an abutment member 60. The pressure arrangement 32 is used to reduce the pressure exerted on the opposite ends of the bale for and during the ejection of the bale and thereby the friction of the side walls 26 on the end faces of the bale so that the cylindrical bale can be more easily discharged or ejected from the baling chamber 28.

As viewed from the side in FIG. 1, the ramp 58 is located on a circle arc that is concentric about the pivot axis 34 and is fastened to the outside of both side walls 26, although it would be sufficient to provide only one ramp 58, that is, on one side wall 26, as shown in FIG. 2. In the present embodiment, the ramp 58 is formed by a bent steel component that is bolted to the side walls 26 within the chamber 42 and is uniformly inclined so as to increase in height from top to bottom.

The abutment member 60 is provided on the rear support structure 30 on the side of the arm 46 facing the longitudinal center plane of the large round baler 10, and is configured as a sliding surface. In order to minimize friction, the sliding surfaces are lubricated; alternatively, the abutment member 60 can also be configured as a wheel, a roll, a ball or a similar rotating member. The abutment member 60 is arranged in such a way that it describes a circular path about the pivot axis 34 upon a rotation of the pivot part 30 and moves along the ramp 58. Preferably, the abutment member 60 is constantly in contact with the ramp 58.

Figure 3:
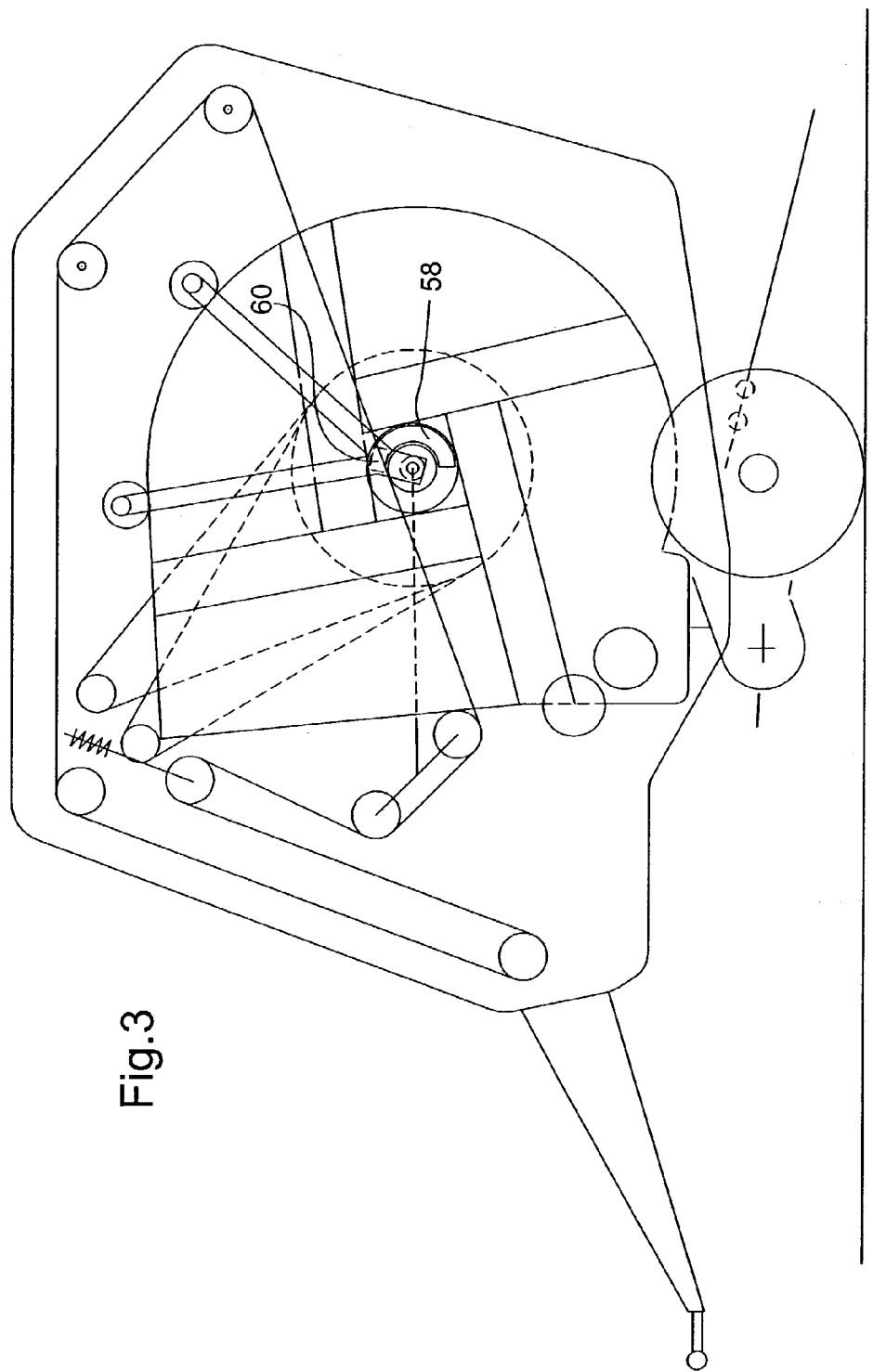
FIG. 3 is a view like that of FIG. 1, but showing the baling chamber of the large round baler in an open position.

The abutment member 60 lies upon the highest rise of the ramp 58 when the rear support structure 30 is located in its lowered baling position, shown in FIG. 1, wherein a cylindrical bale can be produced. When the support structure 30 is brought into its upper bale discharge position, as shown in FIG. 3, in which the cylindrical bale can be released from the baling chamber 28, the abutment member 60 is moved to the lowest position of the ramp 58. The difference between the highest and the lowest position may amount, for example, to approximately 20 to 50 mm.

As soon as a bale has been formed in the baling chamber 28, the rear support structure 30 is raised, whereupon the side walls 26 move outward on the basis of the pressure existing in the baling chamber 28 that originates from the compressed harvested crop. As a result, the friction between the inner side of the side walls 26 and the end faces of the cylindrical bale is reduced and the latter falls out of the baling chamber 28 under the force of gravity. As soon as the cylindrical bale has left the baling chamber 28, and the large round baler 10 has been moved so far further that the rear support structure 30 can again be lowered, a pivoting movement of the rear support structure 30 is performed in the opposite direction, so that the abutment member 60 is moved to the highest point of the ramp 58 and thereby presses the side walls 26 inward.

Having described the preferred embodiment, it will become apparent that various modifications can be made without departing from the scope of the invention as defined in the accompanying claims.

The invention claimed is:

1. In a large round baler including a wheeled chassis; a frame fixed to said chassis and including a pair of upright support walls respectively located at opposite sides of said baler; a baling chamber defined in part by opposite chamber side walls and bale-forming elements, for forming cylindrical bales and where at least one of said chamber side walls is at least partially elastic so that it may be flexed laterally, and at least one bale-forming element is carried by a support structure mounted for swinging about a horizontal, transverse pivot axis between a lowered baling position and a raised bale-discharge position, the improvement comprising: a pair of axles respectively fixed to said pair of support walls and projecting inwardly along said axis to a location at least near an adjacent one of said chamber side walls; said support structure including a pair of side frames respectively mounted on said pair of axles; at least one of said chamber sidewalls having an outwardly facing surface section which defines a ramp disposed about said pivot axis and increasing in height from top to bottom relative to a remainder of said at least one chamber side wall; and one of said side frames carrying an abutment surface located in contact with a bottom portion of said ramp when said support structure is in said lowered baling position and positioned for engaging said upper portion of said ramp and limiting outward flexure of said at least one chamber wall when said support structure is in said bale discharge position.

2. The large round baler, as defined in claim 1, wherein said axis is located in a central region of said baling chamber.

3. The large round baler, as defined in claim 1, wherein said at least one chamber side wall is equipped with reinforcing struts that extend generally tangentially to said axis.

4. The large round baler, as defined in claim 1, wherein said chamber side walls each have outer edge sections formed at a radius about said axis; and said side frames of said support structure being interconnected by at least one baling element support roll that moves along said edge sections when said support structure moves between said baling and bale discharge positions.

5. The large round baler, as defined in claim 1, wherein said ramp extends arcuately about said axis.

* * * * *